US012588583B2

(12) United States Patent
Pederson et al.

(10) Patent No.: US 12,588,583 B2
(45) Date of Patent: Mar. 31, 2026

(54) AGRICULTURAL MACHINES HAVING SECTIONAL CONTROL, AND RELATED SYSTEMS AND METHODS

(71) Applicant: Precision Planting LLC, Tremont, IL (US)

(72) Inventors: Peder Pederson, West Fargo, ND (US); Paul Nystuen, West Fargo, ND (US); Karl-Heinz Mertins, West Fargo, ND (US)

(73) Assignee: Precision Planting LLC, Tremont, IL (US)

( * ) Notice: Subject to any disclaimer, the term of this patent is extended or adjusted under 35 U.S.C. 154(b) by 43 days.

(21) Appl. No.: 18/747,135

(22) Filed: Jun. 18, 2024

(65) Prior Publication Data

US 2024/0334865 A1      Oct. 10, 2024

Related U.S. Application Data

(63) Continuation of application No. 16/967,513, filed as application No. PCT/US2019/016907 on Feb. 6, 2019, now Pat. No. 12,041,868.

(Continued)

(51) Int. Cl.
*A01C 21/00* (2006.01)
*A01C 7/08* (2006.01)
(Continued)

(52) U.S. Cl.
CPC ............ *A01C 21/005* (2013.01); *A01C 7/088* (2013.01); *A01C 15/003* (2013.01);
(Continued)

(58) Field of Classification Search
CPC ..... A01C 21/005; A01C 7/088; A01C 15/003; A01C 15/007; A01C 15/04; A01C 15/06; A01C 15/124; A01C 19/02; G01S 19/13
See application file for complete search history.

(56) References Cited

U.S. PATENT DOCUMENTS 5,052,627 A * 10/1991 Balmer ................ A01C 15/122
239/655
5,950,933 A * 9/1999 Balmer .................. A01C 15/04
239/655

(Continued)

FOREIGN PATENT DOCUMENTS

DE        102004030240 A1      2/2005

*Primary Examiner* — Frederick C Nicolas

(57) ABSTRACT

An agricultural machine includes a product bin configured to store particulate material; a conveyor configured to draw the particulate material from the product bin; a distribution plate including a plurality of apertures; and a sectional control funnel box mounted on the distribution plate. The sectional control funnel box is configured to receive particulate material from the conveyor, and has a plurality of chutes extending therethrough and connecting the sectional control funnel box to the distribution plate. Distribution lines are configured to receive particulate material from a single aperture of the distribution plate and provide the particulate material to a distribution point of the distribution line. A system controller is configured to individually control a flow of the particulate material to each distribution line based on a location of the agricultural machine. Related systems and methods are also disclosed.

19 Claims, 13 Drawing Sheets

Related U.S. Application Data

(60) Provisional application No. 62/626,960, filed on Feb. 6, 2018.

(51) Int. Cl.

| | |
|---|---|
| *A01C 15/00* | (2006.01) |
| *A01C 15/04* | (2006.01) |
| *A01C 15/06* | (2006.01) |
| *A01C 15/12* | (2006.01) |
| *A01C 19/02* | (2006.01) |
| *G01S 19/13* | (2010.01) |

(52) U.S. Cl.
CPC ............ *A01C 15/007* (2013.01); *A01C 15/04* (2013.01); *A01C 15/06* (2013.01); *A01C 15/124* (2013.01); *A01C 19/02* (2013.01); *G01S 19/13* (2013.01)

(56) References Cited

U.S. PATENT DOCUMENTS

| | | | | |
|---|---|---|---|---|
| 10,485,158 | B2 * | 11/2019 | Roberge | A01C 7/124 |
| 10,494,199 | B2 * | 12/2019 | Roberge | B65G 53/4633 |
| 10,563,774 | B2 | 2/2020 | Reich et al. | |
| 11,071,247 | B2 | 7/2021 | Shivak et al. | |
| 11,419,258 | B2 | 8/2022 | Reich et al. | |
| 11,963,476 | B2 | 4/2024 | Dick | |
| 12,041,868 | B2 * | 7/2024 | Pederson | A01C 15/04 |
| 2018/0002112 | A1 * | 1/2018 | Zimmerman | A01C 19/00 |
| 2019/0223371 | A1 * | 7/2019 | Altepeter | A01C 15/04 |
| 2021/0112701 | A1 * | 4/2021 | Dick | A01C 15/04 |
| 2021/0204470 | A1 | 7/2021 | Tollefsrud et al. | |
| 2021/0219487 | A1 | 7/2021 | Pederson et al. | |
| 2022/0195667 | A1 * | 6/2022 | Campbell | D21H 11/20 |
| 2022/0296529 | A1 * | 9/2022 | Salazar Altamar | A61K 9/5084 |

* cited by examiner

AGRICULTURAL MACHINES HAVING SECTIONAL CONTROL, AND RELATED SYSTEMS AND METHODS

This application is continuation of U.S. patent application Ser. No. 16/967,513, filed Aug. 5, 2020, as a national phase entry under 35 U.S.C. § 371 of International Patent Application PCT/US2019/016907, filed Feb. 6, 2019, designating the United States of America and published in English as International Patent Publication WO 2019/157093 A1 on Aug. 15, 2019, which claims priority to U.S. Provisional Application No. 62/626,960 filed Feb. 6, 2018, and entitled "SECTIONAL CONTROL FUNNEL BOX," the disclosure of which is hereby incorporated in its entirety.

FIELD

This disclosure relates generally to sectional control for agricultural spreaders. More specifically, this disclosure relates to sectional control funnel boxes for use during product application by an agricultural spreader.

BACKGROUND

Agricultural spreader machines are available in different configurations, including self-propelled (referred to as a "floater"), pull-type, and 3-point hitch mounted configurations. Agricultural spreaders are used to spread various particulate materials, such as fertilizer, onto fields. While fertilizer spreaders are discussed herein as an exemplar, it is understood that fertilizer is merely one example and that various other granular materials, such as seed, pellets, etc., can be applied. Fertilizers and plant nutrients are incorporated into dry particulate granules for application in soil. The particulate material is loaded into product tanks located on the fertilizer spreader machine. Some fertilizer spreader machines are equipped with at least two separate product tanks, e.g., a primary tank and a secondary tank, to allow the provision of fertilizer blends by dispensing and mixing particulate matter from each tank. As such, the operator can create a desired blend by controlling the ratio supplied from each tank.

To convey the particulate material from each tank, the fertilizer spreader machine utilizes a conveyor belt driven by a pulley and sprocket system. Each product bin typically includes two conveyor belts, with each conveyor belt providing material for distribution on one lateral side of the boom mechanism. The conveyor belts are mounted in parallel. The particulate material is drawn out of the tank onto the conveyor belt. The belt conveys the material and drops the material into a funnel box, which feeds the particulate material to tubes extending laterally away from the machine along the booms of a boom mechanism. A central fan is situated between the left and right sides of the boom mechanism. The fan aids in movement of product into the funnel box and through the tubes extending along the boom mechanism. Each funnel box includes a plurality of distribution points that feed the particulate material to the associated boom and support an even flow of product to each portion of the boom mechanism. As the product falls through the distribution points, the product is entrained in the airflow generated by the fan and is conveyed down the tubes along the boom until the particulate is directed onto the soil by a deflector plate.

Due to asymmetrical field features and the typical working width of fertilizer spreaders, the boom mechanisms of the fertilizer spreader will at times overlap a part of the field on which particulate has already been applied. Overlap and duplicative application due to not being able to control flow to separate boom sections from the product tanks is inefficient and wasteful. Currently, the operator is only able to shut off the feed belt, effectively shutting off the flow of material to one lateral half of the machine. The inability to more closely refine control during product application can cause product waste and reduce yield, due to inefficient application and over application of product.

BRIEF SUMMARY

According to one aspect of the disclosure, a sectional control funnel box includes a funnel box body having an upper receiving portion; a plurality of openings through the upper receiving portion; a first blocker door disposed within the body and movable between a closed state and an open state; a first actuator disposed within the body and configured to actuate the first blocker door between the closed state and the open state; an auger disposed within the upper receiving portion between the first lateral side and the second lateral side; and a motor operably connected to the auger to drive rotation of the auger. In the closed state, the first blocker door is disposed between at least one of the plurality of openings and at least one of the plurality of chutes such that particulate material is prevented from entering the at least one chute from the upper receiving opening. In the open state the blocker door is positioned to allow particulate material to enter the at least one chute from the upper receiving opening.

According to another aspect of the disclosure, a sectional control system includes a sectional control funnel box; a conveyor including a conveyor belt configured to convey the particulate material to the upper opening of the sectional control funnel box from a product bin; and control circuitry. The sectional control funnel box includes a funnel box body having an upper receiving portion; a plurality of openings through the upper receiving portion; a first blocker door disposed within the body and movable between a closed state and an open state; a first actuator disposed within the body and configured to actuate the first blocker door between the closed state and the open state; an auger disposed within the upper receiving portion between the first lateral side and the second lateral side; and a motor operably connected to the auger to drive rotation of the auger. In the closed state, the first blocker door is disposed between at least one of the plurality of openings and at least one of the plurality of chutes such that particulate material is prevented from entering the at least one chute from the upper receiving opening. In the open state the blocker door is positioned to allow particulate material to enter the at least one chute from the upper receiving opening. The control circuitry is configured to output an auger speed command to the motor to alter an output speed of the motor and thus a rotational speed of the auger; output a door command to the actuator to cause the actuator to shift a position of the first blocker door; and output a conveyor speed command to the conveyor to alter a speed of the conveyor belt.

According to yet another aspect of the disclosure, a method includes determining a relative location of a machine in a field; and controlling a flow of the particulate material from a plurality of openings in an upper receiving portion of a funnel box to a plurality of chutes extending through the funnel box based on the relative location of the machine in the field, wherein each one of the plurality of chutes is associated with a distribution point located along a boom of the machine.

DETAILED DESCRIPTION

Figure 1A:
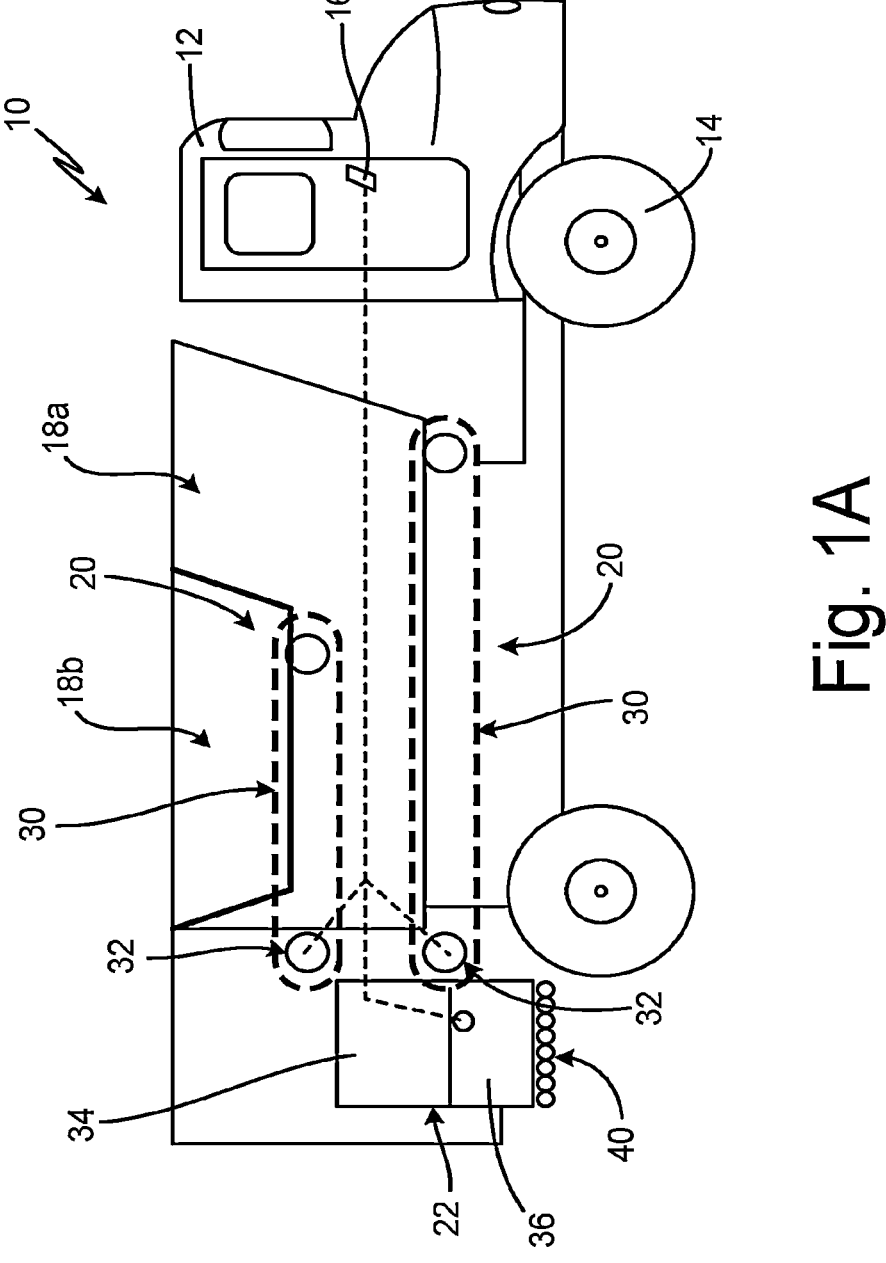
FIG. 1A is a side schematic view of a floater.
Figure 1B:
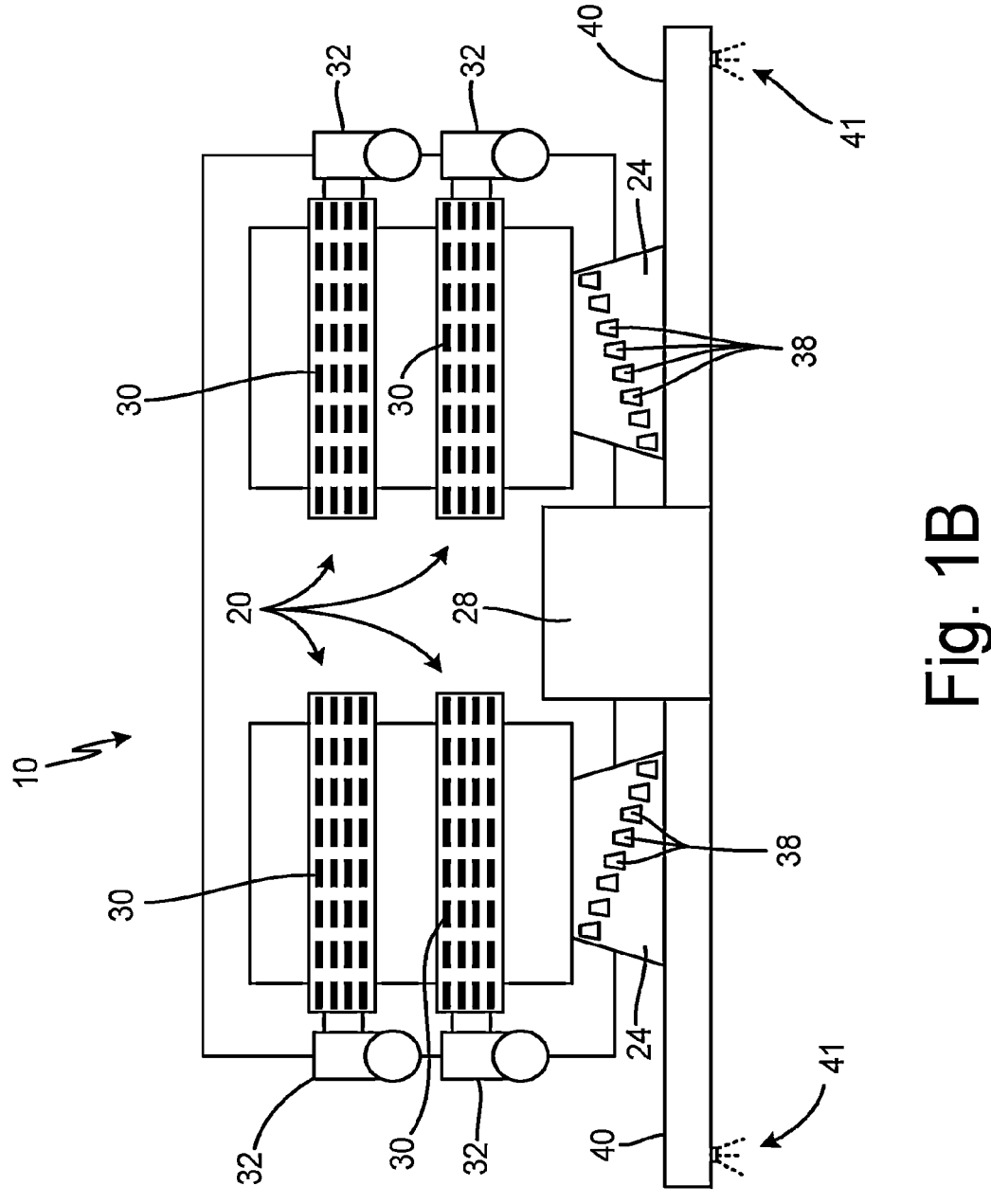
FIG. 1B is a rear schematic view of a floater.
Figure 1C:
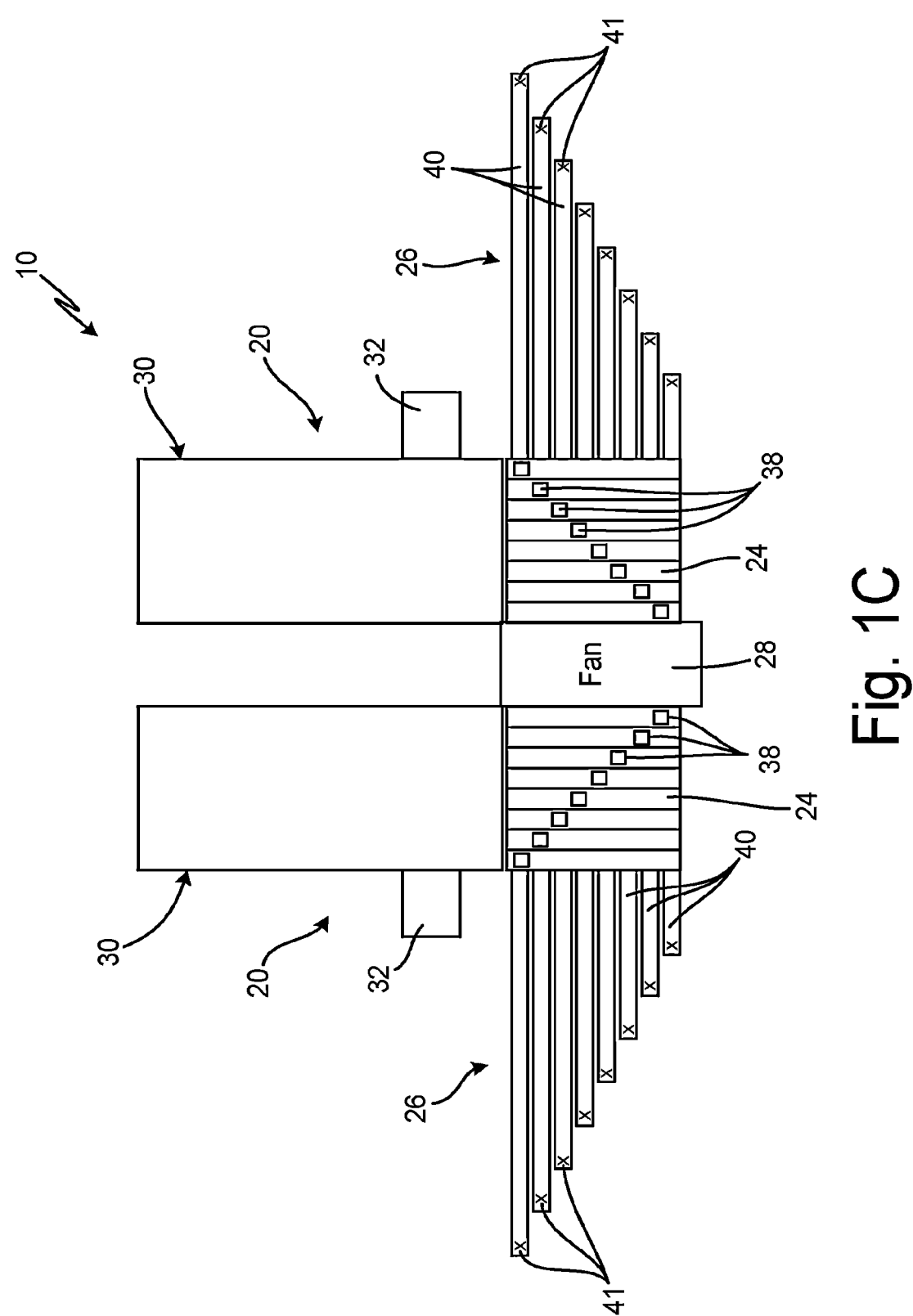
FIG. 1C is a top schematic view of a floater.
Figure 1D:
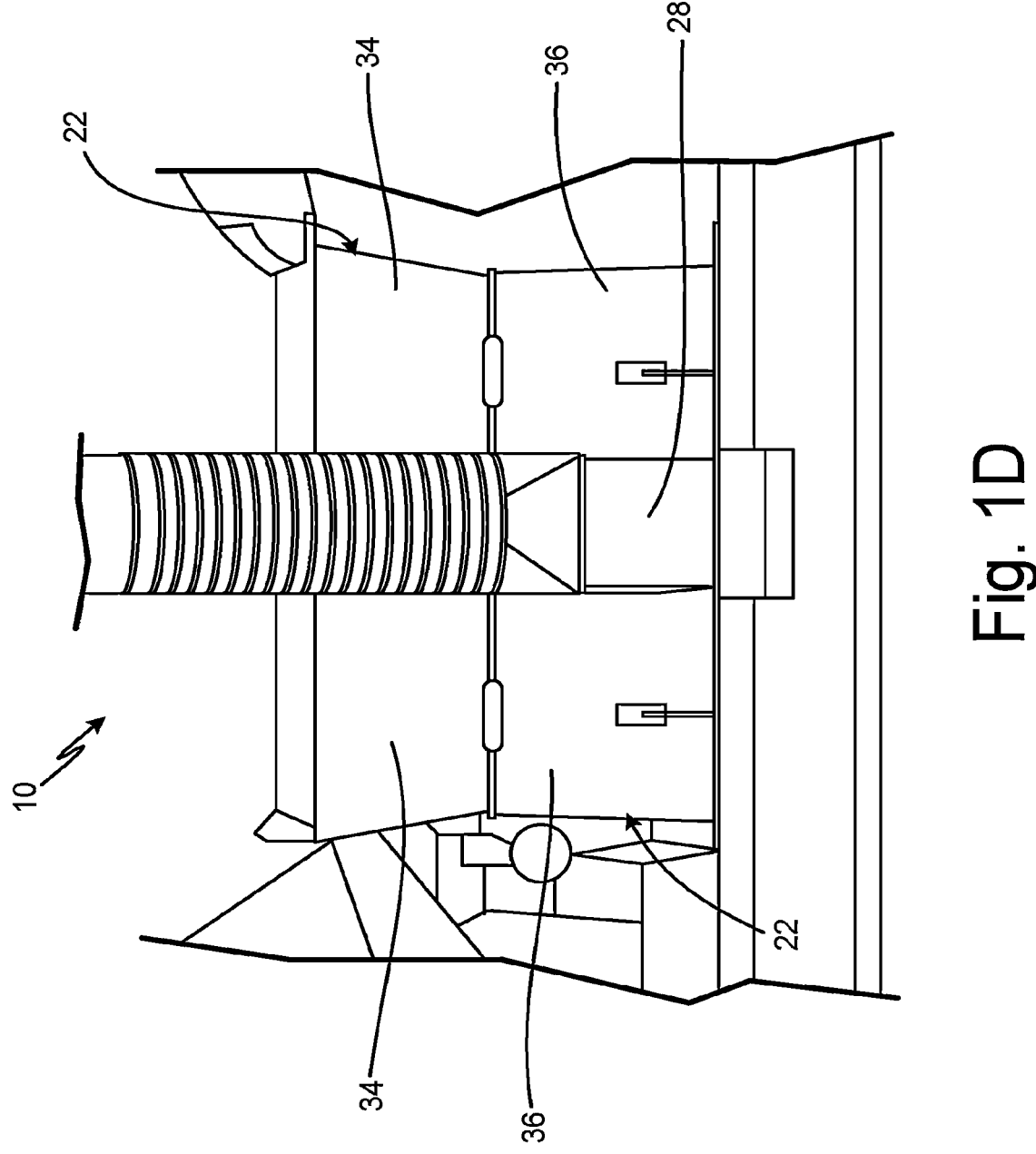
FIG. 1D is a rear schematic view of a floater.

FIG. 1A is a side schematic view of floater 10. FIG. 1B is a rear schematic view of floater 10. FIG. 1C is a rear elevation view of floater 10. FIGS. 1A-1C will be discussed together. Floater 10 includes cab 12, wheels 14, system controller 16, primary product bin 18a, secondary product bin 18b, bin conveyors 20, funnel box assemblies 22, distribution plates 24, booms 26, and fan 28. Conveyors 20 each include belt 30 and drivetrain 32. Each funnel box assembly 22 includes upper funnel box 34 and sectional control funnel box 36. Each distribution plate 24 includes a plurality of apertures 38. Each boom 26 includes a plurality of distribution lines 40, and each distribution line includes a distribution point 41. While floater 10 is shown as including primary product bin 18a and secondary product bin 18b, it is understood that floater 10 can include one product bin or more than two product bins to provide as many product bins as desired for a particular application. Floater 10 includes a first lateral side and a second lateral side. The first and second lateral sides are preferably mirror-images of each other. As such, a single lateral side will be discussed in detail.

Primary product bin 18a and secondary product bin 18b are configured to hold supplies of particulate material prior to application of the material in a field. The particulate material can be the same material in each of primary product bin 18a and secondary product bin 18b, or the particulate can vary between the bins. In some examples, the particulate material includes fertilizer or a blend of fertilizers, in other examples the particulate material includes seed. It is understood, however, that the particulate material can be any particulate material desired to be applied in a field.

Conveyors 20 extend parallel to each other through floater 10. Booms 26 extend laterally from floater 10 and receive the particulate material from primary product bin 18a and secondary product bin 18b. The conveyors 20 associated with primary product bin 18a draw particulate material from primary product bin 18a and provide the particulate material directly to sectional control funnel box 36. The conveyors 20 associated with secondary product bin 18b draw particulate material from secondary product bin 18b and provide the particulate material to upper funnel box 34, which funnels the particulate material to sectional control funnel box 36.

Sectional control funnel box 36 is mounted on distribution plate 24 and includes a plurality of chutes (best seen in FIGS. 4A-4B) extending through sectional control funnel box 36. The chutes guide the particulate material through sectional control funnel box 36 to distribution plate 24. Each chute is associated with one of the apertures 38 that extend through distribution plate 24. Each chute provides a flow-path for the particulate material to pass through sectional control funnel box 36 between conveyor and boom 26. Sectional control funnel box 36 is the lower funnel box in funnel box assembly 22. Sectional control funnel box 36 controls the flow of particulate material to each aperture 38 and thus to distribution points along boom 26. The sectional control capabilities of sectional control funnel box 36 are discussed in more detail in FIGS. 2A-4B.

Upper funnel box 34 is mounted on sectional control funnel box 36. In some examples, upper funnel box 34 does not include any internal dividers, but it is understood that upper funnel box 34 can include internal dividers such that upper funnel box 34 also includes chutes, similar to sectional control funnel box 36. Upper funnel box 34 guides the particulate material into sectional control funnel box 36.

Distribution lines 40 are tubes extending along booms 26 from apertures 38. Distribution lines 40 convey the particulate material to individual distribution points 41 along boom 26. The particulate exits distribution lines 40 at distribution points 41. Each distribution point can be an orifice or nozzle in distribution line 40 through which the particulate exits distribution line 40. Each distribution line 40 is associated with an individual aperture 38 through distribution plate 24, such that each distribution line 40 receives particulate material from a single associated aperture 38. As such, each distribution point 41 receives particulate material from a single aperture 38 through distribution plate 24.

Fan 28 is mounted on floater 10 and is configured to generate an airflow and provide the airflow to distribution lines 40. The airflow draws the particulate material into distribution lines 40 and drives the particulate material through distribution lines 40 to the distribution points. The airflow generated by fan 28 runs underneath the distribution plate through distribution lines 40, thereby creating a suction. The suction draws the particulate material through apertures 38 in distribution plate 24 and into distribution lines 40. The particulate is entrained in the airflow and conveyed through distribution lines 40 by the airflow. The particulate is carried to the distribution points, where the particulate material impinges on a plate that redirects the particulate to fall out of distribution line 40 and onto the soil.

For each conveyor 20, drivetrain 32 is connected to and drives belt 30. In some examples, conveyor 20 includes a sprocket that is driven by drivetrain 32, with belt 30 extending over and driven by the sprocket. Belt 30 can also extend over one or more idler sprockets. Drivetrain 32 can be of any suitable configuration for driving movement of belt 30. For example, drivetrain 32 can be a hydraulic motor, a pneumatic motor, or an electric motor. When the particulate material reaches the end of belt 30, the particulate material falls off of the belt 30 and into funnel box assembly 22. Funnel box assembly 22 guides the particulate material to apertures 38 in distribution plate 24, and thus to distribution lines 40 extending along boom 26.

Each distribution line 40 includes a deflector (not shown) that the particulate material impinges on prior to exiting distribution line 40 at distribution point 41. The deflector directs the particulate material out of distribution line 40 and onto the soil. In one example, the particulate hitting the deflector triggers acoustic sensors attached to the outside of the deflectors. The acoustic sensors can communicate various parameters to the operator in cab 12 via system controller 16. For example, the sensors can indicate the quality of the lateral product distribution, indicate how much product has been distributed, and/or provide feedback for an open-loop or closed-loop system capable of controlling the product distribution. Other embodiments include a strain detecting sensor including, but not limited to, surface acoustic devices, piezoelectric strain sensors, BOTDR (Brillouin optical time-domain reflectometer) and other optical fiber strain sensors.

As discussed in more detail below with regard to FIG. 5, system controller 16 can implement sectional control utilizing sectional control boxes 36 to control which distribution lines 40 receive particulate material at any given time. System controller 16 can implement the sectional control based on the location of floater 10 and the distribution points on boom 26 relative to areas of the field on which the particulate material has already been applied. For example, system controller 16 can control the opening and closing of doors in sectional control funnel box 36 based on location data received from a geo-positioning system. For example, system controller 16 can control sectional control funnel box 36 based on location data from GPS (Global Positioning System), GNSS (Global Navigation Satellite System), GPS/RTK (GPS/Real Time Kinematic), or equivalent systems.

Sectional control funnel box 36 is retrofittable onto a dry-granular fertilizer spreader. Sectional control funnel box 36 gives the operator the ability to control product distribution by activating individual close-off doors located above the machine boom entrance. The close-off doors and a variable speed auger can meter fertilizer and other particulate material in a manner whereby the flow of fertilizer can be stopped, or adjusted, for portions of the working width of the fertilizer spreader machine, thereby providing sectional control by distributing the desired proportion of material to the desired sections of boom 26.

Figure 2A:
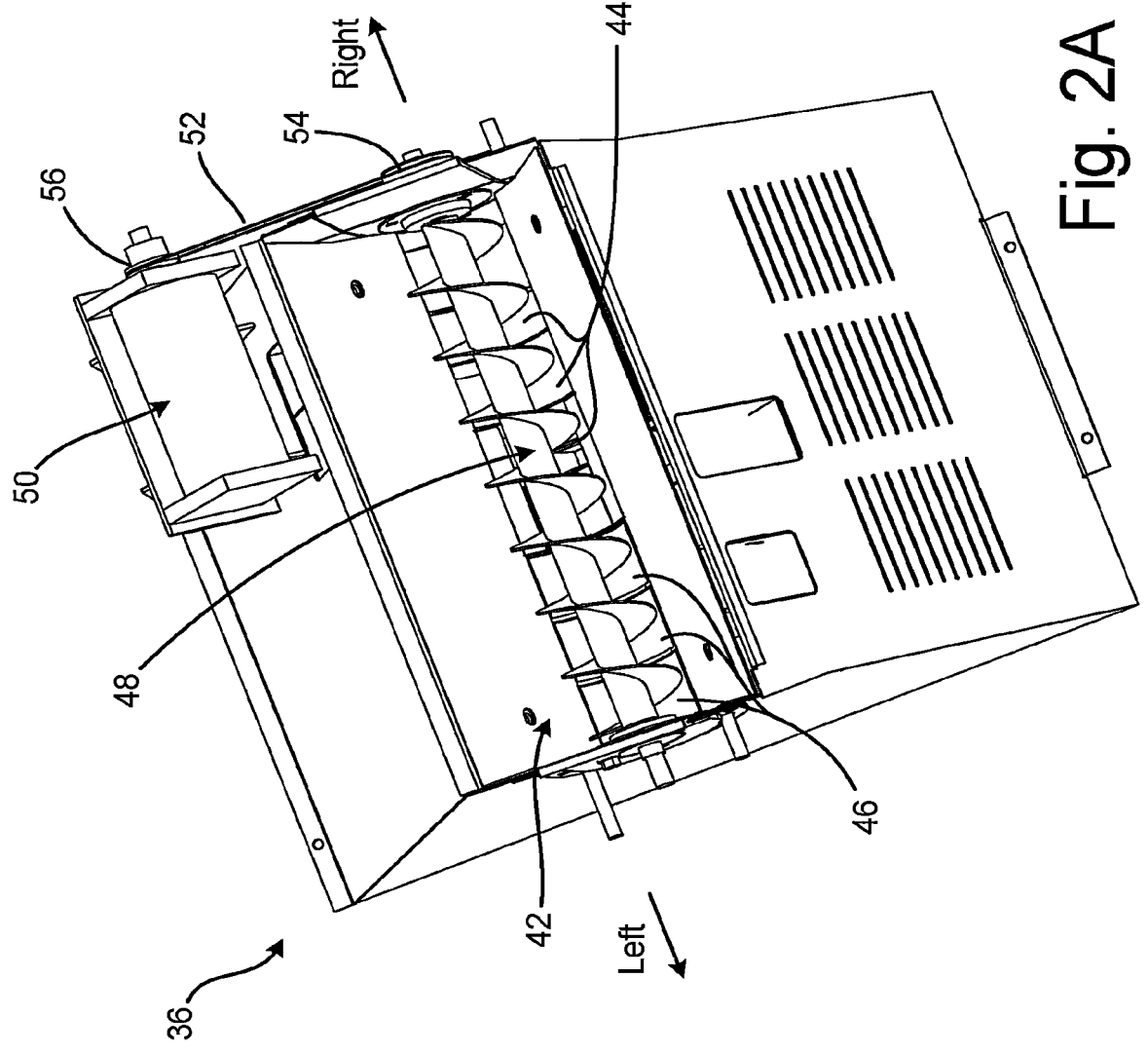
FIG. 2A is a first isometric view of a sectional control funnel box.
Figure 2B:
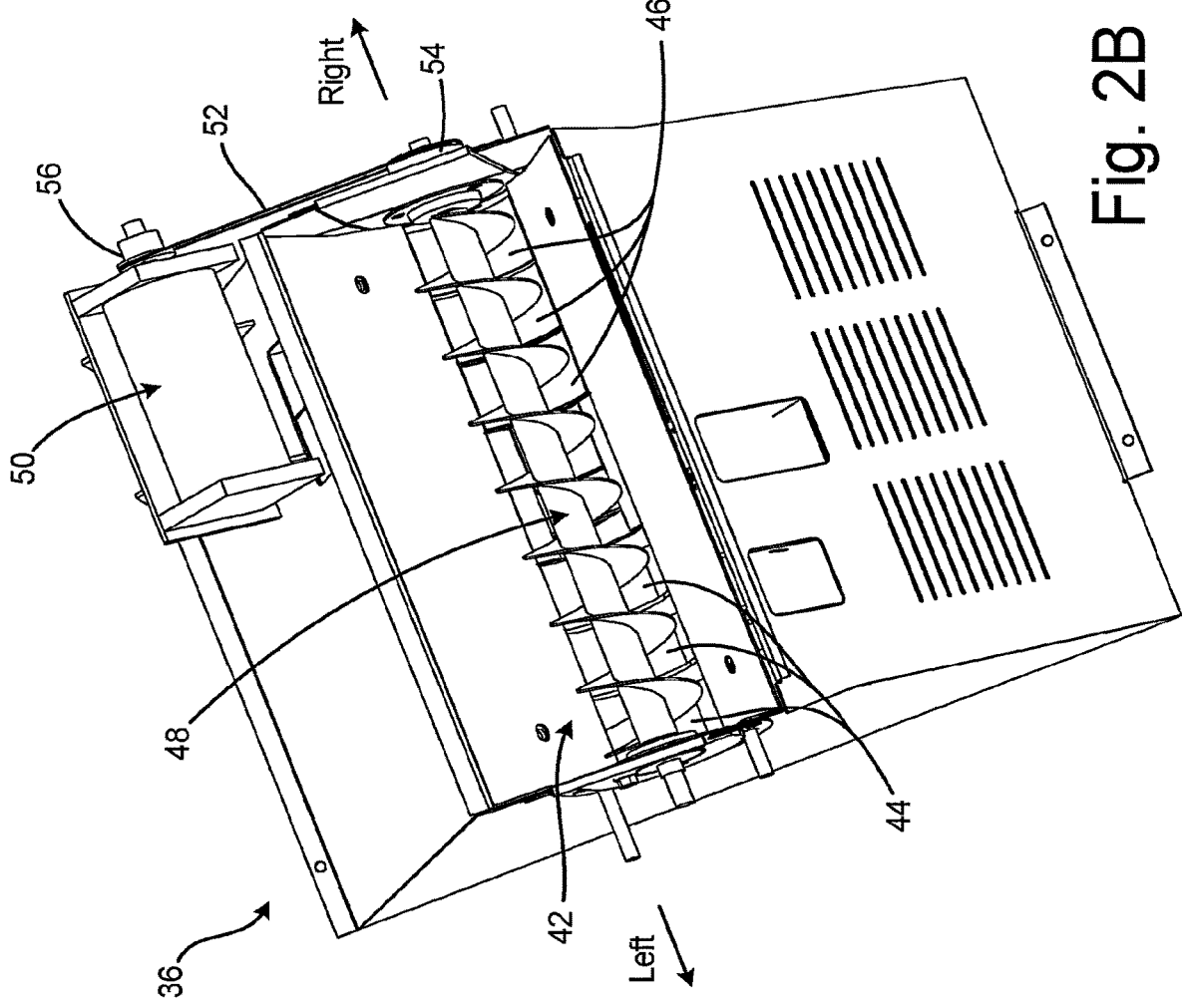
FIG. 2B is a second isometric view of a sectional control funnel box.

FIG. 2A is a first isometric view of sectional control funnel box 36. FIG. 2B is a second isometric view of sectional control funnel box 36. FIGS. 2A and 2B will be discussed together. Sectional control funnel box 36 includes upper receiving portion 42, chute openings 44, blocker doors 46, auger 48, auger motor 50, and chain 52. Auger 48 includes auger drive wheel 54. Auger motor 50 includes motor drive wheel 56.

Sectional control funnel box 36 is configured to control the flow of particulate material to distribution lines 40 (FIGS. 1A-1C). Sectional control funnel box 36 is, in some examples, the lower funnel box of a funnel box assembly 22 (FIGS. 1A-1C) on a floater. In some examples, sectional control funnel box 36 can be retrofit onto an existing floater to replace the existing lower funnel box. In such an example, sectional control funnel box 36 can provide sectional control capabilities to a floater previously lacking those capabilities.

Auger 48 is mounted in receiving portion 42 of sectional control funnel box 36. Auger 48 is configured to rotate within receiving portion 42 to evenly distribute the particulate material across chute openings 44 through receiving portion 42. Auger drive wheel 54 is disposed at an end of auger 48 extending out of sectional control funnel box 36. Auger motor 50 is mounted on sectional control funnel box 36 and is configured to drive rotation of auger 48. Chain 52 extends around motor drive wheel 56 and auger drive wheel 54 and is configured to transmit rotational power from auger motor 50 to auger 48. While auger motor 50 is described as mounted on sectional control funnel box 36, it is understood that auger motor 50 can be disposed at any desired location suitable for driving rotation of auger 48. For example, auger motor 50 can be mounted directly on floater 10 (FIGS. 1A-1C). In addition, while auger motor 50 is described as driving the rotation of auger 48 via chain 52, it is understood that auger motor 50 can be operatively connected to drive rotation of auger 48 in any desired manner. For example, motor drive wheel 56 can be directly meshed with auger drive wheel 54, or a gear train can be disposed between and operatively connect motor drive wheel 56 and auger drive wheel 54. Moreover, it is understood that motor drive wheel 56 and auger drive wheel 54 can be of any suitable configuration for transmitting rotational power. In one example, auger drive wheel 54 is a sprocket, motor drive wheel 56 is a sprocket, and chain 54 is configured to be receive by the sprockets of auger drive wheel 54 and motor drive wheel 56. In another example, chain 52 can be a flexible belt, motor drive wheel 56 can be a belt drive, and auger drive wheel 54 can be a pulley. In some examples, chain 52 is a toothed belt and each of motor drive wheel 56 and auger drive wheel 54 can include teeth configured to interface with the teeth of the toothed belt.

Auger motor 50 is a variable speed motor, such that auger motor 50 can drive auger 48 at any desired speed. Auger motor 50 can also be dual directional, such that auger motor 50 can drive auger 48 in both a first rotational direction (either clockwise or counterclockwise) and a second rotational direction (the other of clockwise and counterclockwise).

Chute openings 44 are disposed at a bottom of receiving portion 42 and define the top openings of chutes 66 (best seen in FIGS. 4A and 4B) that extend through sectional control funnel box 36. Chute openings 44 are configured to receive the particulate material that is dropped into receiving opening 42 from one of conveyors 20 (FIGS. 1A-1B). Chute openings 44 provide an entrance for the particulate material to enter chutes 66 that extend through sectional control funnel box 36 between receiving portion 42 and distribution plate 24 (FIG. 1B).

Blocker doors 46 are disposed below chute openings 44 and are movable between an open state and a closed state. Blocker doors 46 are also positionable at any desired position between fully open and fully closed, such that blocker doors 46 can partially restrict the flow of particulate through chute openings 44. In the closed state, each blocker door 46 prevents the particulate material from exiting receiving portion 42 through those chute openings 44 that blocker door 46 is associated with. In the open state, blocker door 46 allows the particulate material to pass out of receiving portion 42 through those chute openings 44 that blocker door 46 is associated with. With blocker door 46 in the open state the particulate material can thus flow through the chutes extending through sectional control funnel box 36 and into distribution lines 40 (FIGS. 1A-1B) for application in the field.

Sectional control funnel box 36 can include as many or as few blocker doors 46 as desired. In one example, sectional control funnel box 36 includes two blocker doors 46. In such an example a first subset of chute openings 44 is associated with the first blocker door 46 and a second subset of chute openings 44 is associated with the second blocker door 46. As such, the flow of particulate material through the first and second subsets can be individually controlled. In another example, a third subset of chute openings 44 is not associated with any blocker door 46, such that the third subset of chute openings 44 is always open. In one example, the always-open chute openings 44 are associated with the innermost, relative to the floater, dispensing points on boom 26. In yet another example, a third blocker door 46 is associated with the third subset of chute openings 44 to control the flow of particulate material through the third subset. As such, the flow of particulate material through each chute opening 44 can be controlled by a blocker door 46. It is understood, however, that sectional control funnel box 36 can include as many or as few blocker doors 46 as desired.

In the example shown, sectional control funnel box 36 includes the same number of blocker doors 46 as there are chute openings 44. In such an example, the flow of particulate material through each chute opening 44 is individually controlled by individual blocker doors 46. As shown in FIG. 2A, blocker doors 46 associated with the chute openings 44 on the left side of sectional control funnel box 36 are open and blocker doors 46 associated with the chute openings 44 on the right side of sectional control funnel box 36 are closed. As such, the particulate can flow through the chute openings 44 on the left, but not right, side of sectional control funnel box 36. As shown in FIG. 2B, blocker doors 46 associated with the chute openings 44 on the right side of sectional control funnel box 36 are open and blocker doors 46 associated with the chute openings 44 on the left side of sectional control funnel box 36 are closed. As such, the particulate can flow through the chute openings 44 on the right, but not left, side of sectional control funnel box 36. It is understood that each blocker door 46 can be individually controlled to control which chute openings 44 are open and which chute openings 44 are closed.

During operation, sectional control funnel box 36 is mounted on floater 10 as the lower funnel box of the funnel box assembly 22. Conveyors 20 provide a steady stream of particulate material to receiving portion 42 of sectional control funnel box 36. Auger motor 50 drives rotation of auger 48 via chain 52. Auger 48 evenly distributes the particulate material within receiving portion 42, preventing undesired build up in receiving portion 42 when any of blocker doors 46 are in the closed state. Auger 48 is driven in a rotational direction that drives the particulate material within upper receiving portion 42 towards those chute openings 44 that have blocker door 46 in the open state.

Auger motor 50 is configured to drive auger 48 at variable speeds based on a variety of factors. For example, the speed of auger motor 50 can be adjusted based on the number of chute openings 44 that are open and/or on the ground speed of floater 10, among other variables. In addition, auger motor 50 being configured to drive auger 48 in either rotational direction ensures that auger 48 directs the particulate material towards open chute openings 44, regardless of the lateral position of those chute openings 44 along receiving portion 42. Auger 48 is configured to evenly spread the particulate across those chute openings 44 that are in an open state, thereby preventing build-up of particulate on closed chute openings 44 and preventing clogging. The operator and/or control system controls blocker doors 46 between the open state and the closed state to allow or prevent the flow of particulate material to distribution lines 40.

Sectional control funnel box 36 provides on/off or adjustable control of the flow of particulate material from product bins 18*a*, 18*b* to the distribution points along booms 26. Sectional control funnel box 36 prevents over-application in areas of a field that floater 10 has already traversed. Preventing over-application saves material costs by eliminating particulate material waste due to over application. Sectional control funnel box 36 can also be retrofit onto an existing floater by removing the existing lower funnel box and installing sectional control funnel box 36. Sectional control funnel box 36 can be connected to the operating unit of the floater to allow for autonomous control of auger motor 50 and blocker doors 46. As such, sectional control funnel box 36 provides low cost, easily installed sectional control capabilities to floaters not previously equipped with sectional control capabilities.

Figure 3A:
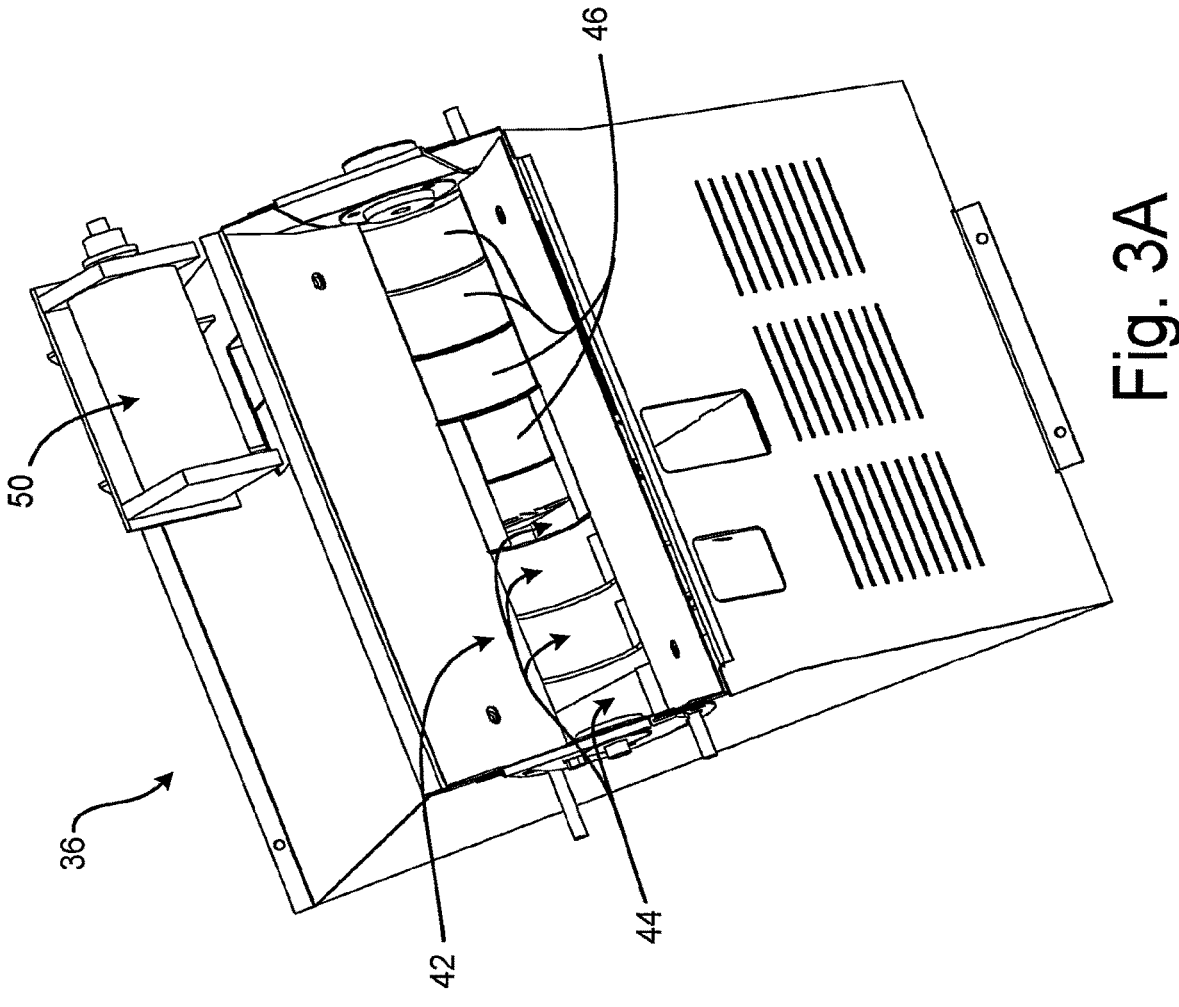
FIG. 3A is a first isometric view of a sectional control funnel box with an auger removed.
Figure 3B:
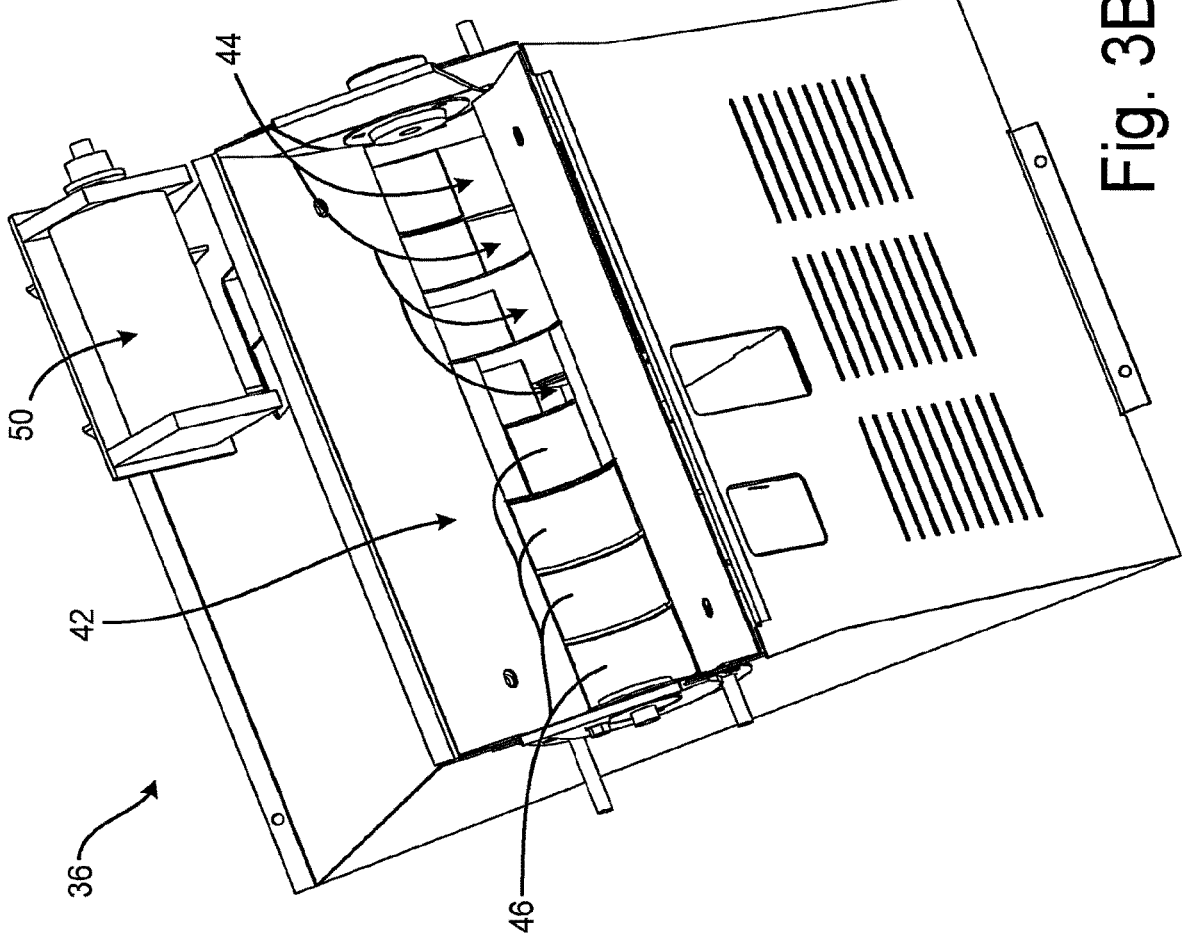
FIG. 3B is a second isometric view of a sectional control funnel box with an auger removed.
Figure 3C:
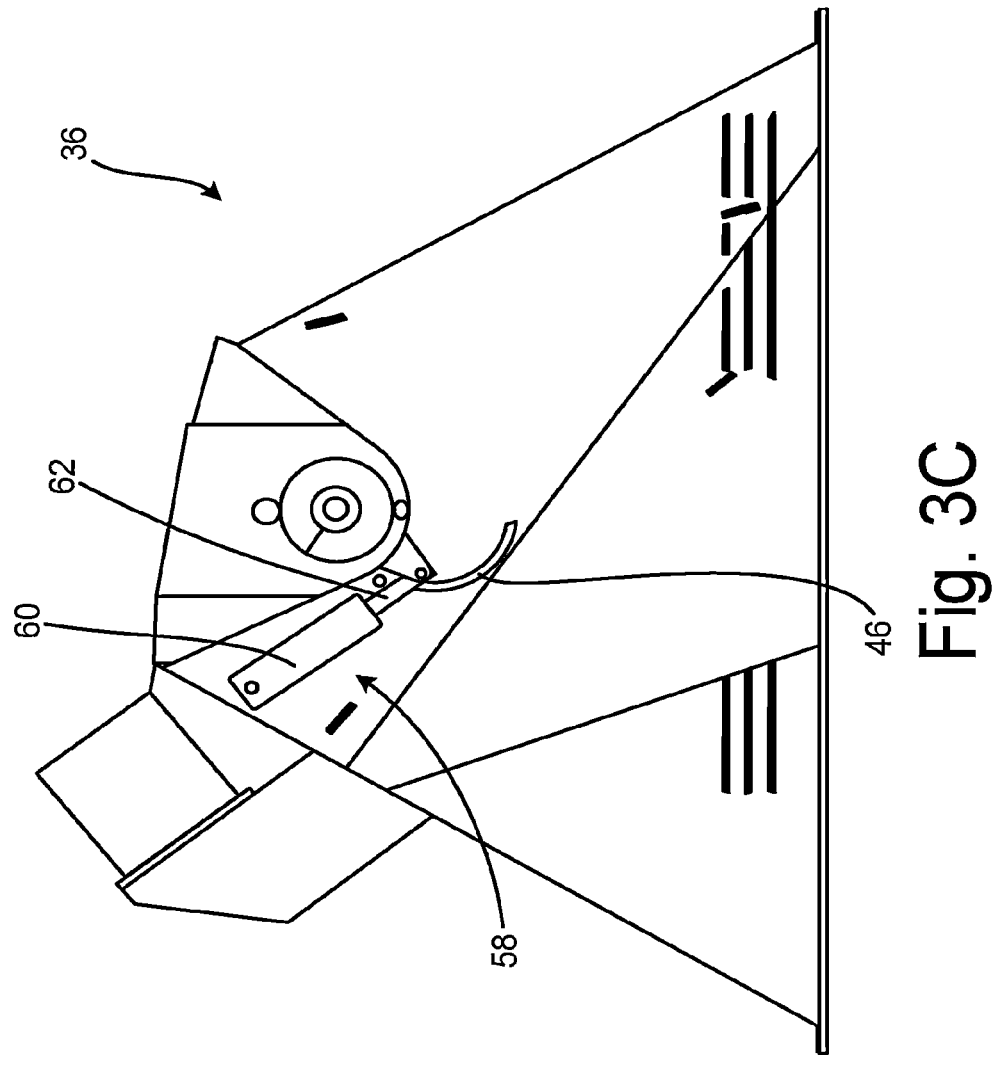
FIG. 3C is a side schematic view of a sectional control funnel box.

FIG. 3A is an isometric view of sectional control funnel box 36 with auger 48 removed for clarity. FIG. 3B is another isometric view of sectional control funnel box 36 with auger 48 removed for clarity. FIG. 3C is a side schematic view of sectional control funnel box 36 showing blocker door 46 and actuator 58. Sectional control funnel box 36 includes receiving portion 42, chute openings 44, blocker doors 46, auger motor 50, and actuator 58. Actuator 58 includes actuator motor 60 and actuator arm 62.

Blocker doors 46 are mounted in sectional control funnel box 36 below chute openings 44. Blocker doors 46 are movable between an open state, where particulate material can exit receiving portion 42 via chute openings 44, and a closed state, where blocker door 46 prevents the particulate material from exiting receiving portion 42 through chute openings 44. Blocker doors 46 can be moved between the open state and the closed state in any desired manner. For example, blocker doors 46 can pivot or slide linearly between the open state and the closed state.

It is understood that sectional control funnel box 36 can include as many or as few blocker doors 46 as desired. In addition, each blocker door 46 can be associated with as many or as few chute openings 44 as desired. In one example, sectional control funnel box 36 includes three blocker doors 46 each associated with a subset of chute openings 44. The first blocker door 46 is associated with three chute openings 44 forming the first subset. The second blocker door 46 is associated with two chute openings 44 forming the second subset. The third blocker door 46 is associated with three chute openings 44 forming the third subset. Each subset of chute openings 44 is associated with specific distribution points along boom 26 (FIGS. 1B-1C). In one example, the first subset is associated with three distribution points furthest from floater along boom, the second subset is associated with two middle distribution points, and the third subset is associated with three distribution points closest to the floater along the boom. Opening and closing blocker doors 46 determines which distribution points receive particulate material at any given time. It is understood, however, that sectional control funnel box 36 can include as many or as few blocker doors 46 as desired, and each blocker door 46 can be associated with as many or as few chute openings 44 as desired.

In the example shown, sectional control funnel box 36 includes the same number of blocker doors 46 as chute openings 44. As shown in FIG. 3A, blocker doors 46 associated with the chute openings 44 on the left side of sectional control funnel box 36 are open and blocker doors 46 associated with the chute openings 44 on the right side of sectional control funnel box 36 are closed. As such, the particulate can flow through the chute openings 44 on the left, but not right, side of sectional control funnel box 36. As shown in FIG. 3B, blocker doors 46 associated with the chute openings 44 on the right side of sectional control funnel box 36 are open and blocker doors 46 associated with the the chute openings 44 on the left side of sectional control funnel box 36 are closed. As such, the particulate can flow through the chute openings 44 on the right, but not left, side of sectional control funnel box 36. It is understood that each blocker door 46 can be individually controlled to control which chute openings 44 are open and which chute openings 44 are closed.

Each blocker door 46 is associated with and actuated by an actuator 58. Actuator motor 60 is mounted within sectional control funnel box 36. Actuator arm 62 extends from actuator motor 60 and is connected to blocker door 46. Actuator 58 drives blocker door 46 between the open state and the closed state. Actuator 58 is configured to position blocker door 46 at any desired position between the open state and the closed state. As such, blocker door 46 can be partially open to reduce, but not fully close, the size of the flowpath through chute openings 44 to chutes 66. Actuator can be of any desired configured suitable for shifting blocker door 46 between the open state and the closed state. For example, actuator motor 60 can be a hydraulic motor, a pneumatic motor, or an electric motor. Actuator arm 62 can be of any suitable configuration for causing displacement of blocker door 46. For example, actuator arm 62 can be a screw and actuator motor 60 can be configured to rotate the screw to cause displacement of blocker door 46. In another example, actuator arm 62 can be a piston and actuator motor 60 can be a linear drive configured to linearly displace actuator arm 62 to displace blocker door 46.

The position of each blocker door 46 can be manually and/or automatically controlled. For example, the operator can control blocker door 46 between the open state and the closed state by sending a signal to actuator 58 to cause actuator 58 to shift the position of blocker door 46. In another example, system controller 16 (best seen in FIG. 5) can automatically control blocker doors 46 between the open and closed states based on the relative location of the floater in the field, such as through geo-referencing. In some examples, the system controller 16 can be configured such that the operator can override the automatic door positioning through manual control, such as via a mobile device or a virtual terminal.

Figure 4A:
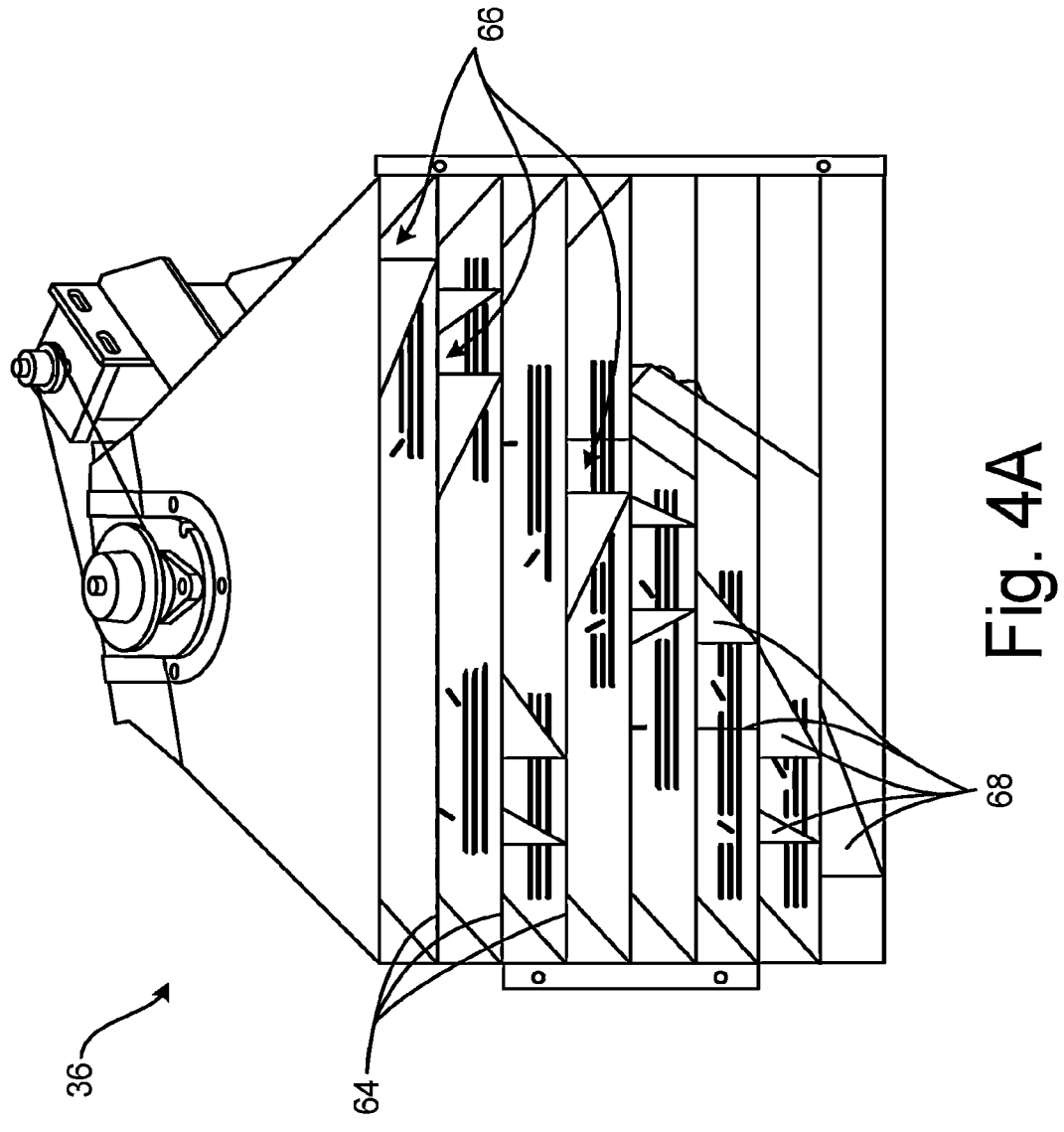
FIG. 4A is a bottom isometric view of a sectional control funnel box.
Figure 4B:
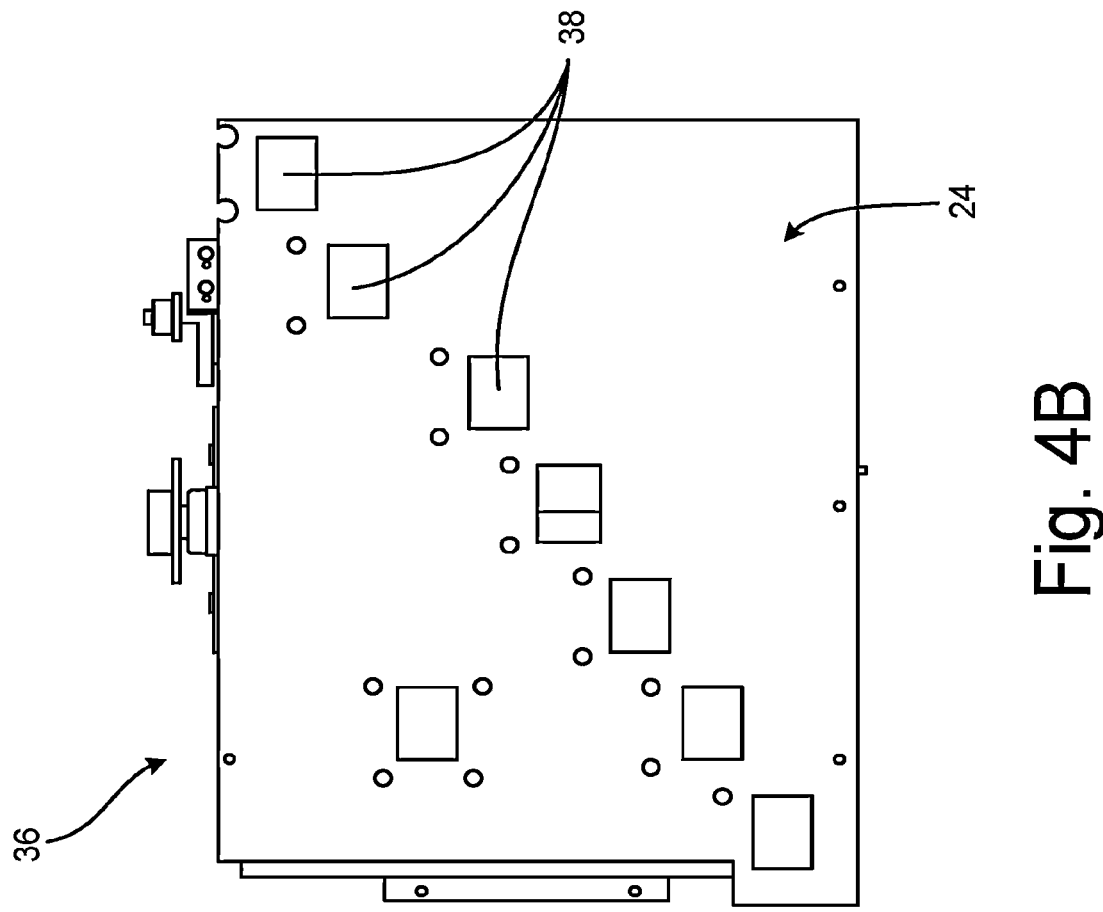
FIG. 4B is a bottom plan view of a sectional control funnel box and distribution plate.

FIG. 4A is a bottom isometric view of sectional control funnel box 36. FIG. 4B is a bottom plan view of sectional control funnel box 36 mounted on distribution plate 24. FIGS. 4A-4B will be discussed together. Dividers 64 and chutes 66 of sectional control funnel box 36 are shown. Each chute 66 includes at least one wall 68. Distribution plate 24 includes apertures 38.

Dividers 64 extend lengthwise through sectional control funnel box 36 and separate each chute 66 from each adjacent chute 66. The front and back of each chutes 66 is defined by walls 68. Chutes 66 extend through sectional control funnel box 36 between receiving portion 42 (shown in FIGS. 2A-3A) and distribution plate 24. Each chute 66 is associated with a single aperture 38 extending through distribution plate 24, such that any particulate matter entering a chute 66 is transported to the associated aperture 38. As discussed above, each aperture 38 through distribution plate 24 is associated with a distribution line extending laterally along the boom. As such, each chute 66 provides particulate matter to a single distribution line of the boom. For each chute 66, walls 68 and dividers 64 guide the particulate matter to the aperture 38 associated with the chute 66.

Figure 5:
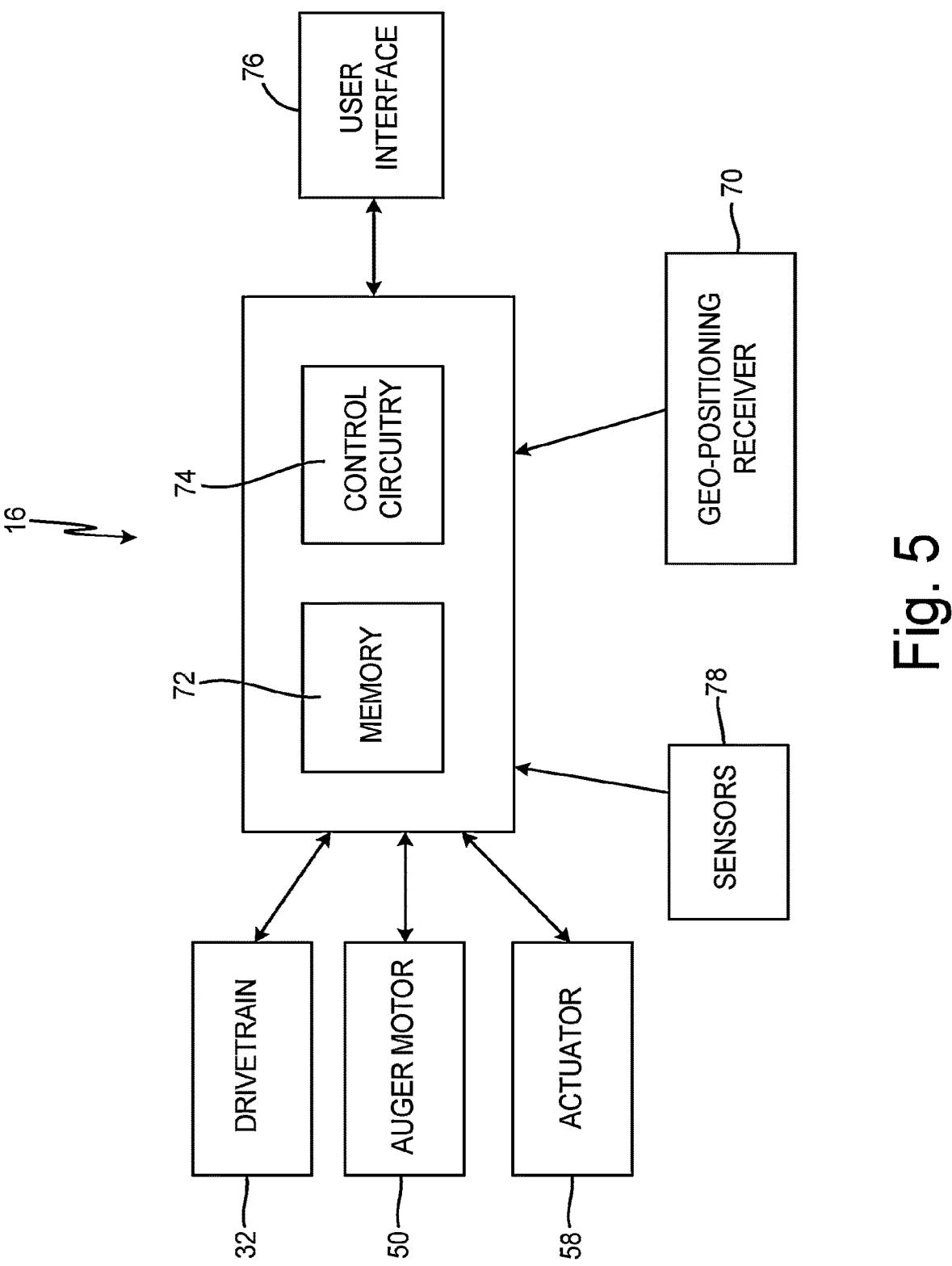
FIG. 5 is a block diagram of a control system.

FIG. 5 is a block diagram of system controller 16. System controller 16 includes geo-positioning receiver 70, memory 72, control circuitry 74, and user interface 76. System controller 16 is in communication with drivetrain 32, auger motor 50, actuators 58, and sensors 78.

System controller 16 is configured to control the flow of particulate material to distribution points along boom 26 (FIG. 1C). System controller 16 is configured to control the operation of various components of floater 10 (FIGS. 1A-1D) to provide sectional control to floater 10. It is understood that system controller 16 can be of any suitable configuration for controlling operation of components of floater 10, gathering data, processing data, etc. In some examples, system controller 16 can be implemented as a plurality of discrete circuitry subassemblies. In one example, control circuitry 74 is configured to implement functionality and/or process instructions. For instance, control circuitry 74 can be capable of processing instructions stored in memory 72. Examples of control circuitry 74 can include any one or more of a microprocessor, a controller, a digital signal processor (DSP), an application specific integrated circuit (ASIC), a field-programmable gate array (FPGA), or other equivalent discrete or integrated logic circuitry.

Memory 72, in some examples, can be configured to store information during operation. Memory 72, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 72 is a temporary memory, meaning that a primary purpose of memory 72 is not long-term storage. Memory 72, in some examples, is described as volatile memory, meaning that memory 72 does not maintain stored contents when power is turned off. Examples of volatile memories can include random access memories (RAM), dynamic random access memories (DRAM), static random access memories (SRAM), and other forms of volatile memories. In some examples, memory 72 is used to store program instructions for execution by control circuitry 74. Memory 72, in one example, is used by software or applications running on system controller 16 to temporarily store information during program execution.

Memory 72, in some examples, also includes one or more non-volatile computer-readable storage media. Memory 72 can be configured to store larger amounts of information than volatile memory. Memory 72 can further be configured for long-term storage of information. In some examples, memory 72 includes non-volatile storage elements. Examples of such non-volatile storage elements can include magnetic hard discs, optical discs, floppy discs, flash memories, or forms of electrically programmable memories (EPROM) or electrically erasable and programmable (EE-PROM) memories.

User interface 76, such as a keyboard, touchscreen, monitor, mouse, smartphone, tablet, or other suitable interface device, allows a user to interact with system controller 16, such as by retrieving information from memory 72, receiving notifications, initiating the software stored in memory 72, and inputting additional information to memory 72, among other examples. User interface 76 can be integrated into system controller 16 or can be a device separate from system controller 16, such as a smartphone or tablet. In some examples, user interface 76 is a device integrated into and/or mounted within cab 12 of floater 10.

Sensors 78 are disposed at various locations on floater 10 and are configured to provide information to system controller 16. System controller 16 utilizes the information from sensors 78 to generate and provide commands to other components of floater 10. In some examples, sensors 78 can include sensors disposed at dispensing points along boom 26. Sensors 78 can be configured to provide information to system controller 16 regarding the flow of particulate material at the dispensing points. For example, sensors 78 can be acoustic sensors attached to the outside of deflectors located at the dispensing points. The acoustic sensors can communicate various parameters to system controller 16 and to the operator of the floater via user interface 76. For example, the sensors can indicate the quality of the lateral product distribution, indicate how much product has been distributed, and/or provide feedback for system controller 16 regarding product distribution. In other examples, sensors 78 can be a strain detecting sensor including, but not limited to, surface acoustic devices, piezoelectric strain sensors, BOTDR (Brillouin optical time-domain reflectometer) and other optical fiber strain sensors. In yet another example, sensors 78 can include ground speed sensors for providing the ground speed of the floater 10 and/or boom 26 to system controller 16.

Geo-positioning receiver 70, which can be compatible with any desired geo-positioning system, such as GPS, GNSS, and GPS/RTK, is communicatively connected to system controller 16. System controller 16 receives geo-positioning information from geo-positioning receiver 70 and can use that geo-positioning information to control the components of floater 10.

During operation, system controller 16 provides commands to actuator 58, auger motor 50, and drivetrains 32 to implement the desired sectional control. The user can provide sectional control commands to system controller 16 via user interface 76, and in some examples the user manually control actuator 58, auger motor 50, and drivetrains 32 via user interface 76 and system controller 16. In other examples, system controller 16 is configured to automatically implement section control based on information received from sensors 78 and geo-positioning receiver 70.

The positions of the dispensing points along boom 26 can be determined and stored in memory 72. In addition, a field map can be generated and stored in memory 72. Based on information from sensors 78, system controller 16 can determine which dispensing points are dispensing particulate at any given time. As such, system controller 16 can determine which dispensing points are dispensing particulate at a given time and can determine the relative location of those dispensing points in the field. By comparing the dispense point information from sensors 78 with geo-positioning information received from geo-positioning receiver 70, system controller 16 can thus determine which areas of the field the particulate has been applied on. System controller 16 stores that treatment information in memory 72 and can utilize the treatment information to implement sectional control.

System controller 16 can determine and monitor the relative position of floater 10 and/or each dispense point within the field based on the information received from geo-positioning receiver 70. In some examples, system controller 16 can operate autonomously, such that system controller 16 implements sectional control based on the position of floater 10 and the portions of the field that have already been treated. In some examples, operator can provide sectional control commands to system controller 16 via user interface 76. System controller 16 can also provide information, such as geo-positioning and field map information, to the operator via user interface 76. The operator can also, in some examples, override the sectional control implemented by system controller 16 via the user interface 76.

System controller 16 can implement sectional control based on one or more baseline criteria, such as whether any particulate has already been applied to a portion of the field; whether a certain minimum amount of particulate has been applied to a portion of the field; soil chemistry in various areas of the field; and the relative location of other features in the field, such as ponds; among other options. For example, the baseline criteria can be that no additional particulate should be applied in areas of the field where any amount of particulate has already been applied.

When system controller 16 determines that floater is approaching an area of the field that meets the baseline criteria, system controller 16 will cause one or more blocker doors 46 to close and adjust the speeds of auger 48 and conveyors 20. System controller 16 can provide a sectional control command to actuator 58 to cause actuator 58 to shift blocker door 46 from the open state to the closed state. With blocker door 46 in the closed state, the particulate is prevented from flowing to those distribution points associated with that blocker door 46. As such, the particulate will not be applied through those distribution points.

System controller 16 also sends a speed command to drivetrain 32 to reduce the speed of conveyor 20. Reducing the speed of conveyor 20 reduces the volume of particulate entering sectional control funnel box 36 (best seen in FIGS. 2A-4B). The volume of particulate entering sectional control funnel box 36 is reduced as the number of closed blocker doors increases because there are fewer distribution points receiving particulate from sectional control funnel box 36. As such, less particulate is required to maintain an even distribution at the distribution points still receiving particulate. Decreasing the speed of conveyor 20 thereby ensures even distribution of the particulate in the field.

System controller 16 also sends an auger command to auger motor 50. The auger command causes auger motor 50 to drive rotation of auger 48 at a desired speed and causes auger motor 50 to drive auger 48 in a desired rotational direction. Auger 48 is rotated to push the particulate towards chute openings 44 (best seen in FIGS. 3A-3B) associated with open blocker doors.

When system controller 16 determines that particulate flow should resume to the blocked distribution points, system controller 16 sends a command to actuator 58 to cause blocker door 46 to move from the closed state to the open state. System controller 16 also sends a command to drivetrain 32 to cause drivetrain 32 to increase the speed of conveyor 20. System controller 16 also sends a command to auger motor 50 to cause auger motor 50 to drive auger 48 at a desired speed and in a desired rotational direction.

System controller 16 provides significant advantages. System controller 16 the flow of particulate to dispensing points through sectional control funnel box 36. As such, system controller 16 accounts for asymmetrical field features and the typical working width of fertilizer spreaders and prevents overlap and duplicative application. System controller 16 can also reduce application rates near certain features, such as wetlands and open water, to thereby prevent water contamination and avoid applying particulate on wetlands or other protected area. System controller 16 thereby increases the efficiency of application while reducing material waste and thus cost.

Sectional funnel box 36 can be controlled automatically or by the operator, based on visual observation, or based on location data received from GPS, GNSS, GPS/RTK or equivalent systems presented as precision field maps and prescription maps, that is displayed to the operator on a mobile device inside the cab of the machine. Alternatively, or additionally, a fully automated, geo-referenced system controller 16 can activate blocker doors, control conveyor speed, and control auger speed and rotational direction. The smart-tracking automatic fertilization may be overridden by the operator taking manual control of to control which sections distribute fertilizer.

Figure 6:
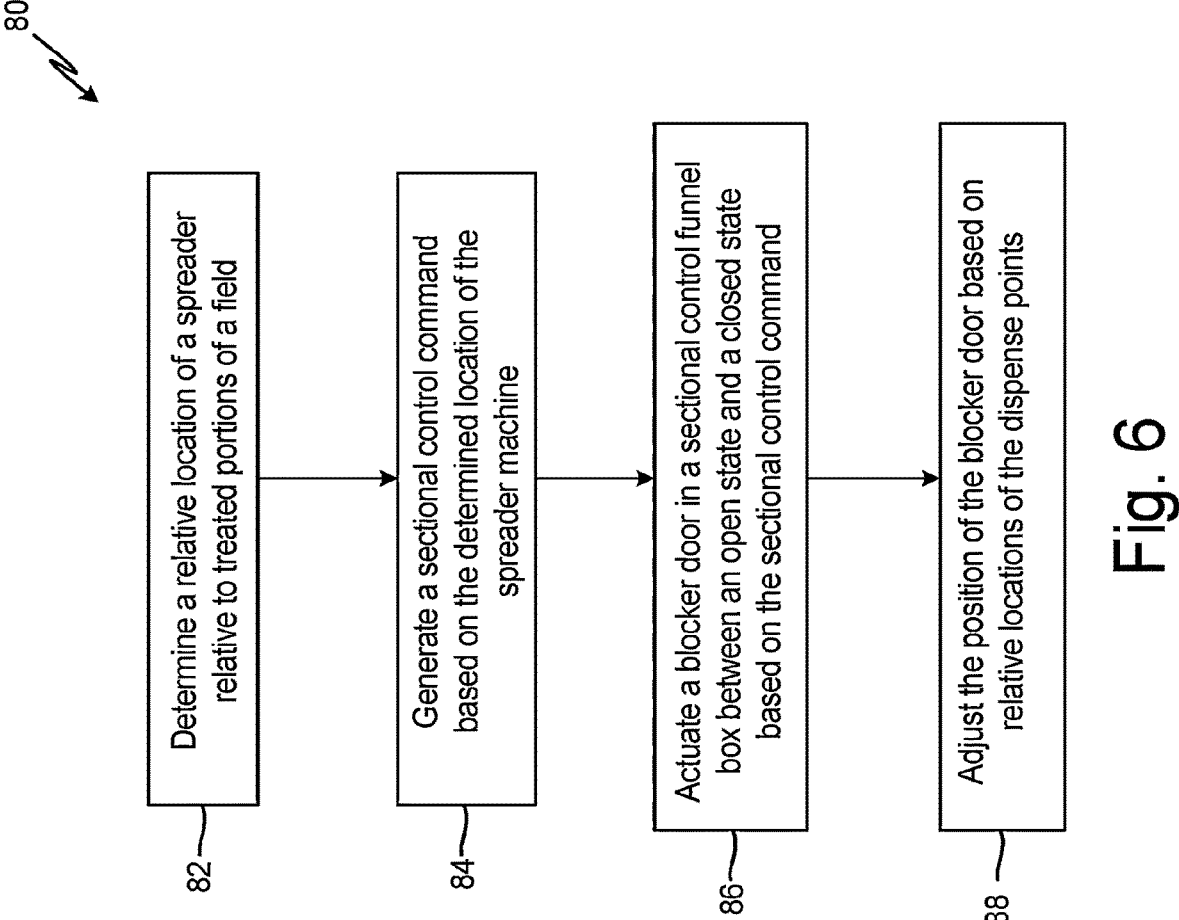
FIG. 6 is a flow chart showing a method for controlling particulate distribution.

FIG. 6 is a flowchart illustrating method 80 of providing sectional control. In step 82, a system controller, such as system controller 16 (FIG. 5), is activated and the system controller determines the areas of the field on which particulate has been applied based on geo-positioning and dispense information. The system controller 16 can determine the location of the boom and dispense points relative to portions of the field on which the particulate material has already been applied, such as via GPS, GNSS, and/or GPS/RTK, for example.

In step 84, the system controller 16 generates and provides sectional control commands to mechanisms on floater 10. For example, system controller 16 can command actuator 58 (FIG. 3C) to cause blocker doors 46 (FIGS. 2A-3C) to shift between the open state and the closed state. The commands are generated by system controller 16 based on the relative location of the floater 10 in the field. System controller 16 can also control the speed of conveyors 20 (FIGS. 1A-1C) and the rotational speed and direction of auger 48 (FIGS. 2A and 2B) to adjust the actual application rate at each dispense point.

In step 86, the actuator 58 drives the blocker door 46 to alter a position of the blocker door based on the command received from system controller 16. Sensors, such as sensors 78 (FIG. 5), provide feedback to the operator and system controller 16 regarding the flow of particulate material to the various distribution points along boom 26. In step 88, system controller 16 causes actuator 58 to adjust the degree to which each blocker door 46 is open to provide a desired particulate distribution across the dispense points. System controller 16 can cause actuator 58 to adjust the position of each blocker door 46 based on the locations of the dispense points relative to already treated portions of the field as the floater traverses the field. As such, the system controller 16 controls the flow of particulate material to the boom via the sectional control funnel box.

Sectional control funnel box 36 allows the operator of a floater to control the flow of particulate material to the boom for application to the field. Controlling the flow of particulate material prevents over-application of the particulate material within the field. Controlling the flow of particulate material prevents reapplication of the particulate material in areas where the particulate material has already been applied, thereby preventing harm due to over application and providing a savings in both costs and materials.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

What is claimed is:

1. An agricultural machine, comprising:
a product bin configured to store particulate material;
a conveyor configured to draw the particulate material from the product bin;
a distribution plate including a plurality of apertures;
a sectional control funnel box mounted on the distribution plate, the sectional control funnel box configured to receive the particulate material from the conveyor, the sectional control funnel box comprising a plurality of chutes extending therethrough and connecting the sectional control funnel box to the distribution plate;
a plurality of distribution lines, each distribution line configured to receive the particulate material from a single aperture of the distribution plate and provide the particulate material to a distribution point of the distribution line; and
a system controller configured to individually control a flow of the particulate material to each distribution line based on a location of the agricultural machine.

2. The agricultural machine of claim 1, wherein each chute is associated with one of the apertures of the distribution plate.

3. The agricultural machine of claim 1, wherein each chute provides a flowpath for the particulate material through the sectional control funnel box to one of the distribution lines.

4. The agricultural machine of claim 1, wherein the sectional control funnel box is configured to individually control a flow of the particulate material through each chute.

5. The agricultural machine of claim 4, wherein the sectional control funnel box is configured to individually control a flow of the particulate material to a first subset of chute openings and a flow of the particulate material to a second subset of chute openings.

6. The agricultural machine of claim 5, wherein:
the first subset of chute openings is associated with a first set of distribution points; and
the second subset of chute openings is associated with a second set of distribution points.

7. The agricultural machine of claim 5, wherein the sectional control funnel box includes a third subset of chute openings.

8. The agricultural machine of claim 7, wherein the third subset of chute openings are located closer to the agricultural machine than the first subset of chute openings and the second subset of chute openings, the third subset of chute openings configured to always be open.

9. The agricultural machine of claim 4, wherein the sectional control box is configured to individually control a flow of the particulate material to each chute opening.

10. The agricultural machine of claim 1, wherein the system controller is configured to individually control a flowrate of the particulate material through a first subset of chute openings and a second subset of chute openings based on a location of the agricultural machine.

11. The agricultural machine of claim 1, wherein the system controller is configured to control which of the distribution lines receive the particulate material from the sectional control funnel box based on locations where the particulate material has previously been applied.

12. The agricultural machine of claim 11, wherein the system controller is configured to control which of the distribution lines receive the particulate material based on a location of the agricultural machine and a location of the distribution point.

13. The agricultural machine of claim 1, further comprising a geo-positioning receiver, the system controller configured to receive geo-positioning information from the geo-positioning receiver.

14. The agricultural machine of claim 13, wherein the system controller is configured to control a flow of the particulate material to the sectional control funnel box based on location data received from the geo-positioning receiver.

15. The agricultural machine of claim 1, further comprising sensors at the distribution point configured to provide information to the system controller regarding the flow of the particulate material at the distribution point.

16. The agricultural machine of claim 15, wherein the system controller is configured to determine areas where the particulate material has been applied based on the information from the sensors and geo-positioning information.

17. The agricultural machine of claim 15, wherein the sectional control funnel box comprises an actuator, the system controller configured to control the actuator based on the information from the sensors and geo-positioning information.

18. A sectional control system for controlling a flowrate of particulate material to different sections of an agricultural machine, the sectional control system comprising:

a product bin configured to store particulate material;

a conveyor including a conveyor belt configured to convey the particulate material to the sectional control funnel box from the product bin;

a distribution plate including a plurality of apertures;

a sectional control funnel box mounted on the distribution plate, the sectional control funnel box configured to receive the particulate material from the conveyor, the sectional control funnel box comprising a plurality of chutes extending therethrough and connecting the sectional control funnel box to the distribution plate;

a plurality of distribution lines, each distribution line configured to receive the particulate material from a single aperture of the distribution plate and provide the particulate material to a distribution point of the distribution line;

a geo-positioning receiver configured to receive geo-positioning information; and control circuitry configured to:

determine locations where the particulate material has previously been applied based, at least in part, on the geo-positioning information; and control a flowrate of the particulate material to different subsets of chutes based on a location of the agricultural machine relative to the locations where the particulate material has previously been applied.

19. The sectional control system of claim 18, wherein control circuitry is configured to generate a field map based on the geo-positioning information and a location of distribution points of the distribution lines.

* * * * *